United States Patent
Rosseau (10) Patent No.: US 6,684,691 B1
(45) Date of Patent: Feb. 3, 2004

(54) METHOD AND SYSTEM FOR DETERMINING TIRE PRESSURE IMBALANCES

(75) Inventor: James R. Rosseau, Birmingham, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/347,151

(22) Filed: Jan. 17, 2003

Related U.S. Application Data (63) Continuation of application No. 09/955,775, filed on Sep. 19, 2001, now abandoned.
(60) Provisional application No. 60/233,532, filed on Sep. 19, 2000.

(51) Int. Cl.[7] .............................................. G01M 17/02
(52) U.S. Cl. ....................... 73/146; 73/146.2; 340/442; 340/444
(58) Field of Search ............................... 73/146, 146.2; 340/442, 444

(56) References Cited

U.S. PATENT DOCUMENTS

| | | | | |
|---|---|---|---|---|
| 3,581,277 A | * | 5/1971 | Beatty et al. ................ | 340/444 |
| 5,721,374 A | * | 2/1998 | Siekkinen et al. ......... | 73/146.2 |
| 6,278,361 B1 | * | 8/2001 | Magiawala et al. ......... | 340/438 |

* cited by examiner

Primary Examiner—Edward Lefkowitz
Assistant Examiner—Alandra Ellington
(74) Attorney, Agent, or Firm—Christopher DeVries (57) ABSTRACT

A tire deflation warning system is based solely on the measured distance traveled by each tire of a: vehicle. The vehicle is equipped with a sensor which generates pulses representative of the distance traveled by each wheel such as generated by an ABS brake system. The system accumulates the pulses in the controller to determine whether the vehicle is stable. If the vehicle is stable, it performs a test to cover individual tires, opposing diagonal tires or any combination of three tires using an average of the diagonal ratio. These tests are performed by utilizing the pulses generated by each wheel representing the distance traveled by the wheel.

24 Claims, 5 Drawing Sheets

METHOD AND SYSTEM FOR DETERMINING TIRE PRESSURE IMBALANCES

RELATED APPLICATION

This application is a continuation of U.S. Ser. No. 09/955,775 filed Sep. 19, 2001, abandoned. This application also claims the benefit of provisional application No. 60/233,532, filed Sep. 19, 2000.

TECHNICAL FIELD

This invention relates to a method of and system for determining imbalances in tire pressure on vehicles equipped with wheel rotation sensors.

BACKGROUND OF THE INVENTION

Some suppliers of automotive chassis control systems offer algorithms that use wheel speed for pneumatic tire inflation monitoring. The typical wheel speed based tire inflation-monitoring algorithm resides within an anti-lock brake controller. This system architecture is required because of the need for high resolution and high wheel speed data throughput. These systems rely on accurate microprocessor timer information to perform the required speed calculations. The measured time between speed ring teeth is used to calculate wheel speed and wheel slip. Due to the nature of these calculations, such systems are prone to noisy data at low and high speeds, under some road conditions, due to imprecise machining of speed ring teeth, and microprocessor timing limitations. A typical wheel speed based system may operate well while traveling in a straight line, at steady speeds, and on smooth surfaces, but exhibit a high rate of false warnings when conditions are not optimal.

SUMMARY OF THE INVENTION

While a vehicle is in motion, the present invention determines when any combination of one, two, or three wheels are in a state of rotational error through an adaptive measurement of the distance that the four wheels have traveled and not through any calculation of wheel speed. This invention has the inherent ability to accurately discern a measure of pneumatic tire pressure imbalance in a way not yet achieved.

More precisely, this invention provides a means to accurately monitor tire pressure imbalance through the measurement of distance by way of digital pulse devices included in existing anti-lock braking systems and vehicle transmissions. Moreover, this invention does not use nor care about the measured time between digital pulses and will operate at the lowest possible speed at which a digital pulse may be sensed. This invention will operate and maintain accuracy equally as well at unrestricted high speeds. This invention will operate expediently on any surface. Tire pressure imbalance is determined while all four wheels are on a similar surface. Furthermore, this invention is able to detect certain surfaces such as gravel, snow, grass, etc.

The first step in this process is to compute a "perfect" average of the diagonal ratio (the ratio of pulses accumulated on one front and its opposite rear over the total pulses). This computation must be performed when the vehicle is traversing a non-deformable surface, has zero acceleration, and is going straight. This "perfect" average is then used to generate a tire deformation adjustment to compensate for acceleration, deceleration, or turning during data collection. This adjustment prevents the false triggering of a warning on tires that are lower than the nominal pressure, but still above the warning threshold. False triggering can be caused by the effect of weight transference due to acceleration, deceleration or cornering on tire rolling radius.

Three separate tests are performed to determine tire pressure loss. The first test covers any individual tire, opposing diagonal tires, or any combination of three low tires. The first step in this process is to compute an average of the diagonal ratio. A requirement of this test is that the diagonal ratio stays within a narrow band. If the diagonal ratio goes outside of the acceptable band, the data is deemed unreasonable, and is not included in the average diagonal ratio. In the case of a rapid loss of pressure, the data will be ignored initially, and then accepted when it meets the criteria of repeatability. If the data is deemed repeatable, the tire deformation adjustment is applied to it and a running average is formed. If the running average is greater than the calibration amount by more than the pressure loss threshold, a warning occurs. If the running average is less than the trigger point, a test is performed to determine if a warning is currently set. If no warning is set, the routine proceeds to the multiple wheel tests. If a warning is set, the routine checks for constant speed and heading. If this criterion is met, the diagonal ratio is tested for being within three PSI of the "perfect" average computed previously. If this condition is met, the warning is cleared.

The two additional pressure loss tests cover the loss of pressure from both of the front, rear, left, or right tires. These multiple wheel tests require that the vehicle is not accelerating, decelerating, or turning. The algorithm looks for repeatability over several tenths of a mile to determine low tires. The distance test must be set to accommodate the longest curve likely to be encountered. To perform this test, lateral and longitudinal distance ratios must be computed. The lateral ratio consists of the ratio of the pulses accumulated on one side of the vehicle to the total pulses. If the lateral or longitudinal ratios are greater than a calibration, then the routine resets the respective test odometer. When the longitudinal odometer counts down to zero, the longitudinal ratio minus a speed related compensation is compared to a pressure loss threshold. A warning occurs if the threshold is exceeded, and is cleared if the longitudinal ratio is within three PSI of the nominal calibration. When the lateral odometer counts down to zero, the lateral ratio is compared to a pressure loss threshold. A warning occurs if the threshold is exceeded, and is cleared if the lateral ratio is within three PSI of the nominal calibration.

The calibration mode is very strict about the data it will accept. It will not accept data during acceleration, deceleration, turning, or any non-repeatable data ratios. If the longitudinal ratio varies outside of a tight calibration, the algorithm rejects the data. If the vehicle is traversing a deformable surface, the routine rejects the data. If the data passes both of these tests, tight repeatability criteria insure that the measurement is valid. The data from the calibration mode is used to compensate the incoming data to eliminate the effects of variation in tire loading, tire size, tire wear that are normally present.

Moreover, this invention will accommodate any steering angle, longitudinal acceleration, or lateral acceleration. In addition, this invention uses an adaptive method to eliminate false warnings by tracking variations in tire pressure that are less than the warning trigger point and adjusting the measurements based on the tire deformation characteristics due to acceleration induced weight transference and/or vehicle load.

Advantageously, this invention will calibrate all four wheels during periods of zero longitudinal and lateral acceleration and adaptively correct for speed variations of all wheels.

Advantageously, this invention will trigger a warning upon reaching a predetermined pressure loss threshold and clear said warning without recalibration upon a tire reaching a predetermined recovery threshold. This is a self-clearing feature which clears the warning when a tire or tires are refilled to a predetermined level within the nominal calibration thresholds or when simply clearing a false trigger precipitated by a juxtaposition of unlikely data events.

Advantageously, this invention will trigger a warning upon the rapid loss of tire pressure. This will allow detection of all types of pressure leakage, from a pinhole leak to a catastrophic failure.

Advantageously, this invention may reside in any vehicle controller or custom built controller that may receive digital pulses from an ABS system and/or a vehicle transmission at any regularly scheduled time interval by any available form of communication.

BRIEF DESCRIPTION OF THE DRAWINGS

This invention may be best understood by reference to the preferred embodiment and to the drawings in which.

DESCRIPTION OF THE PREFERRED EMBODIMENT

Figure 1:
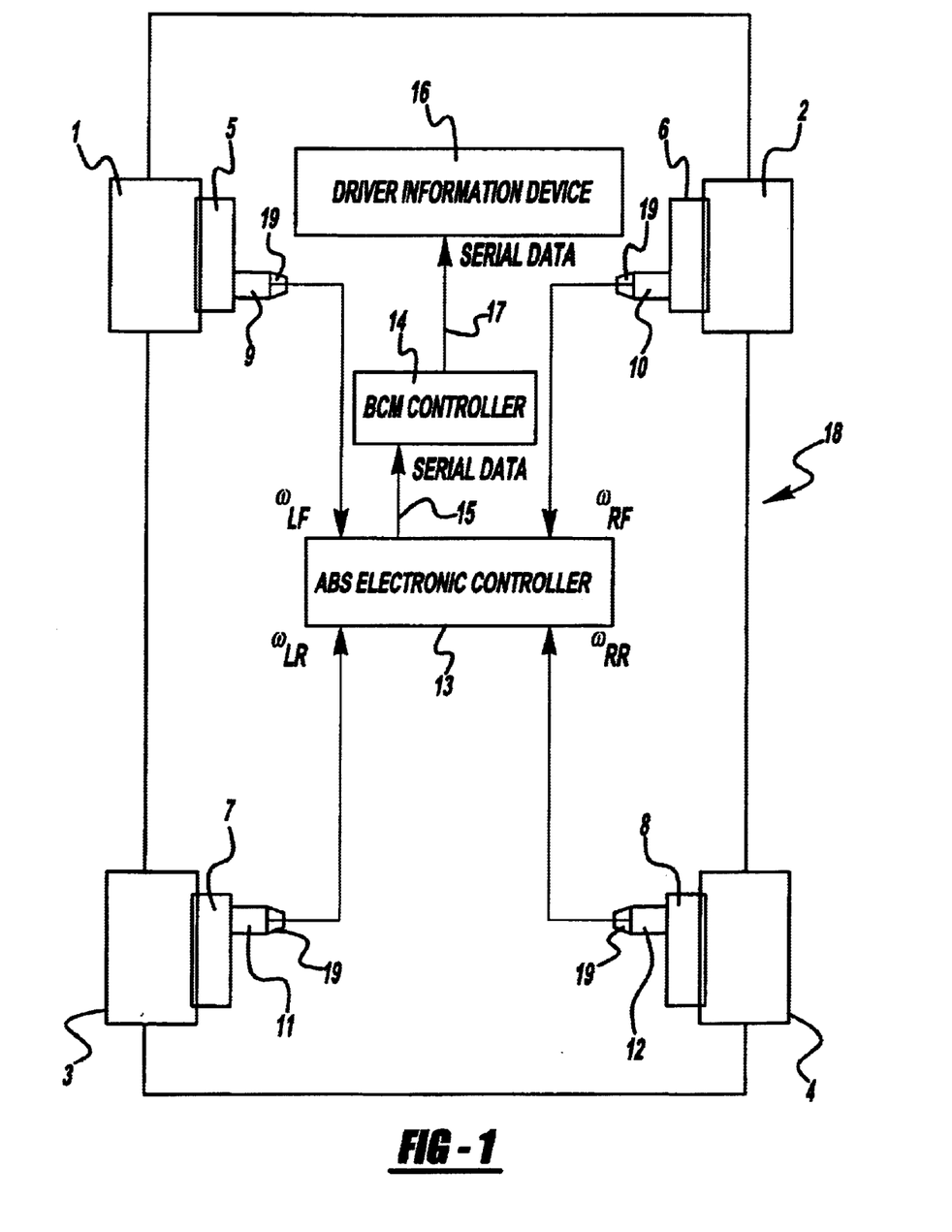
FIG. 1 is a hardware diagram of a vehicle equipped with an anti-lock braking system having a rotation sensor on each wheel. In addition, said anti-lock braking system controller having communication with an additional controller in which (in this embodiment) the invention will operate. The secondary controller having communication with the vehicle to provide a means to inform the vehicle operator through a driver information device of a loss of pneumatic tire pressure balance.

A method and apparatus for detecting under-inflated tires for a vehicle using distance traveled by each of the tires. For the purposes of this invention, only the mechanical and: electrical components are shown. In the preferred embodiment, as shown in FIG. 1, a vehicle 18 is equipped with an Anti-lock Braking System (ABS) and a means to sense all four wheel rotations. Alternatively, the method does not require an ABS system. The method requires at a minimum that wheel rotation sensors are included as well a means of measuring the rotation sensor signals in a controller. The rotation sensor generates a predetermined number of pulses for each revolution of the wheel as in an ABS system.

Referring to FIG. 1, when the left front tire 1 and the matching wheel bearing 5 rotate about an axis, a motion sensor 19 which includes an integrated machined tooth passes a mounted proximity sensor 9 generates a rising edge digital pulse upon first contact and a falling edge digital pulse when the tooth is no longer within the sensor's proximity. An ABS controller 13 receives the rising and/or falling edge digital pulses for each wheel and accumulates the sum of these pulses for each wheel. The ABS system communicates the sum of the digital pulses of each individual wheel to the Body Control Module (BCM) 14 by way of an ordinary serial data interface 15, at regular intervals. The same can be said of the remaining wheels, where the combination of tire and wheel 2, wheel bearing 6, and sensor 10, represent the right front assembly, wheel 3, wheel bearing 7, and sensor 11, represent the left rear assembly, and wheel 4, wheel bearing 8, and sensor 12, represent the right rear assembly. When the sequence of operations as outlined in FIG. 2 determine that a tire or tires are in a state of rotational error because of tire pressure loss, the BCM controller 14 issues a message to the driver information device 16 by way of an ordinary serial data interface 17.

Since this invention is based solely on the distance traveled, a more detailed description of the properties of this invention follows. The method is based solely on the measured distance traveled by each tire. The quantity of machined teeth and rolling circumference of each wheel determines the relationship between sensor pulses and distance. It is well known that a deflated tire has a smaller rolling radius. The basis for this invention is that an under-inflated tire will rotate more than a properly inflated tire. For example, if we have a vehicle having four matching fifteen inch steel belted radial tires, with one tire having a pressure of ten PSI less than the other three tires, then the under-inflated tire will need to rotate the equivalent of 2.8 feet more than the three properly inflated tires will in onetenth of a mile. One rotation of this tire measures 6.3 feet and produces forty-eight digital pulses in that distance. In onetenth of a mile, these tires rotate approximately eighty-four times with each tire producing four thousand and thirty-two digital pulses. The additional 2.8 feet of travel of the under inflated tire will produce an extra twenty-one digital pulses in onetenth of a mile or one extra digital pulse every four wheel rotations.

The pulse counting method has the inherent ability to function properly at any vehicle speed, on any surface, and relatively noise free under adverse driving conditions. A substantial advantage of this method is that it may be utilized in any vehicle controller, as long as it receives the wheel pulse count at regular intervals. This method does not require high throughput and may operate on any real time interrupt time base. Time between teeth is not used.

Figure 2:
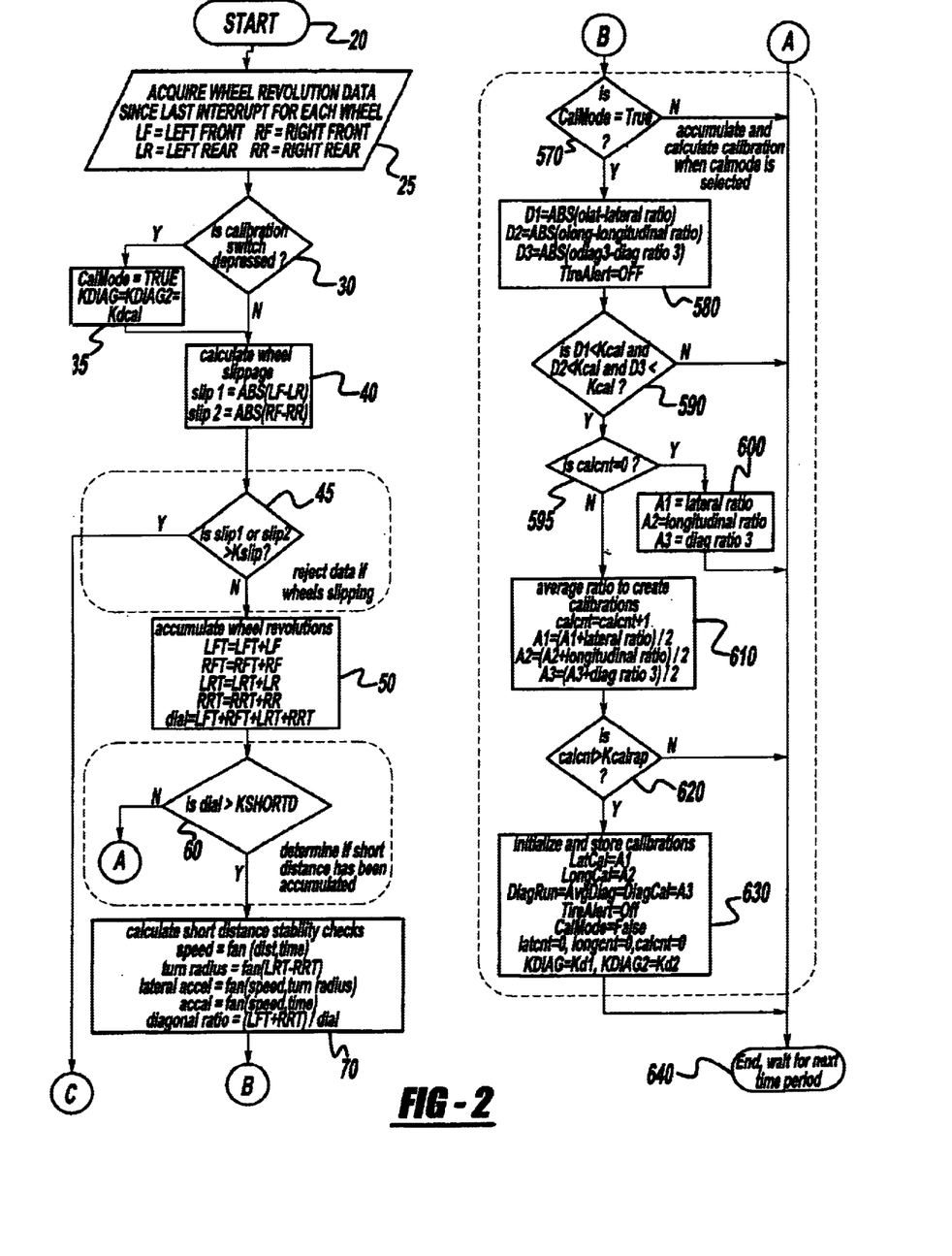
FIGS. 2–5 illustrate a sequence of operations that are executed to carry out the tire pressure warning method function outlined in FIG. 1.
Figure 3:
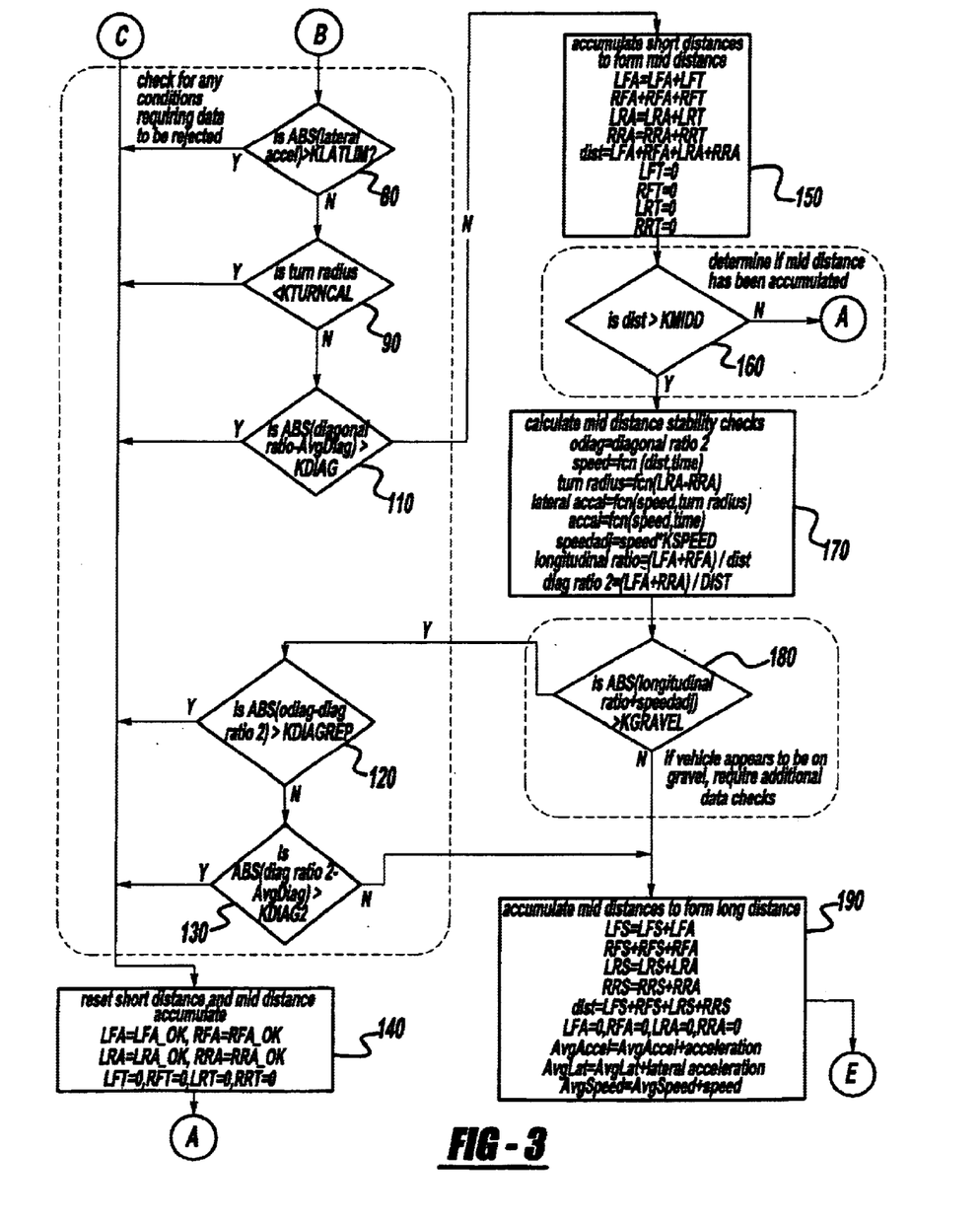
Figure 4:
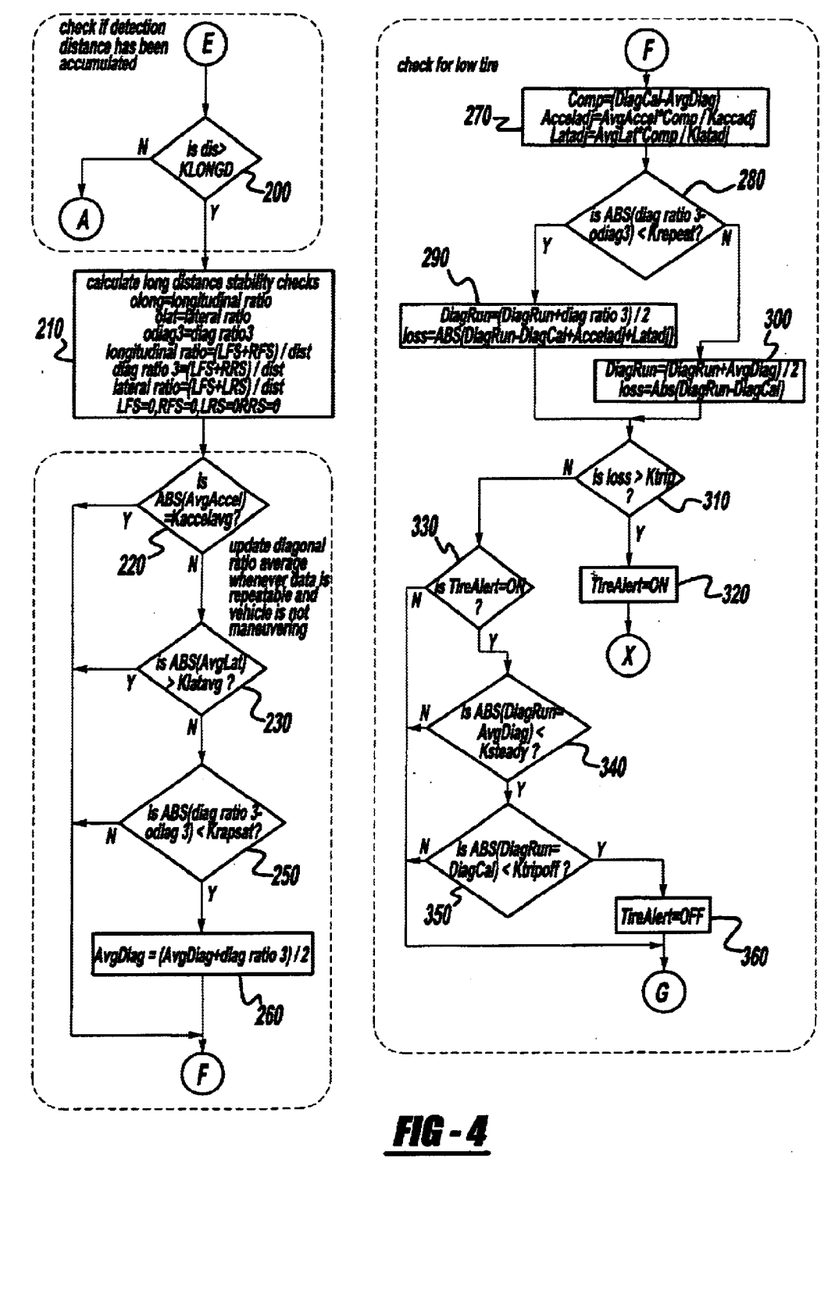
Figure 5:
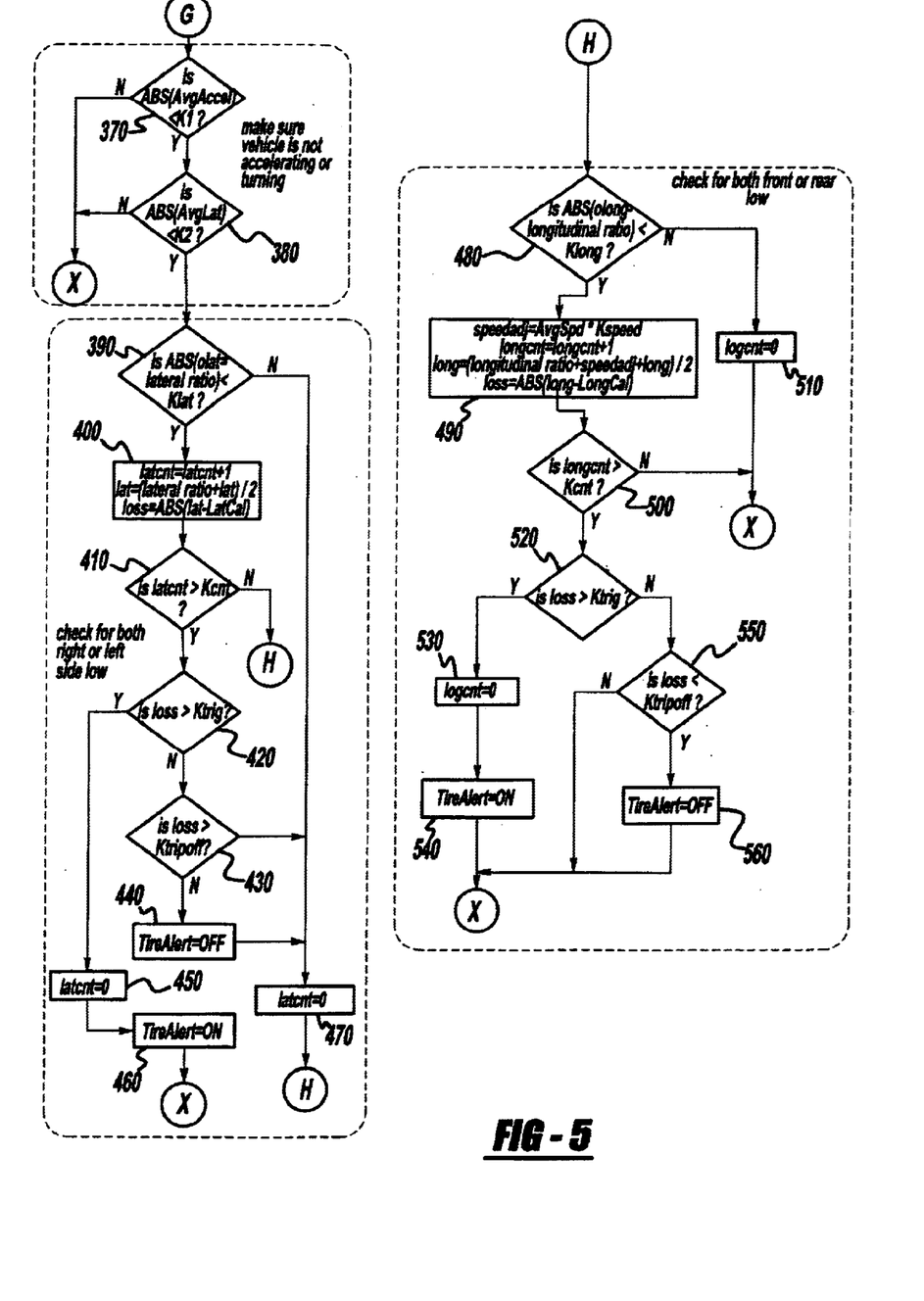

Referring to FIG. 2, a method of detecting under-inflated tires by measuring the rotational variation of vehicle wheels is diagrammed to illustrate the control processes of this embodiment. Referring to FIG. 1, wheel rotation is measured by the ABS controller 13 and all of the digital pulse transitions from proximity sensors 9, 10, 11, and 12, are accumulated by the controller 13 and the individual sums of each wheel transmitted to the BCM 14 at a convenient time interval.

At every interval of one hundred milliseconds, for example, a series of controller instructions generally illustrated by the operations of FIG. 2 starting at step 20 and proceeding to step 25 are executed. At step 25, all of the digital pulses of every individual wheel are received and stored into an individual account bearing the names of: left front (LF), right front (RF), left rear (LR), and right rear. (RR) in a storage device. In step 30, determination is made as to whether the calibration switch is depressed. If it is determined that the calibration switch is on, calibration mode is enabled by setting CalMode=True, and KDAIG=KDAIG2=Kdcal, in step 35, as discussed more fully below.

At every interval of one hundred milliseconds, for example, a series of controller instructions generally illustrated by the operations of FIG. 2 starting at step 20 and proceeding to step 25 are executed. At step 25, all of the digital pulses of every individual wheel are received and stored into an individual account bearing the names of: left front (LF), right front (RF), left rear (LR), and right rear (RR) in a storage device. In step 30, determination is made as to whether the calibration switch is depressed. If it is determined that the calibration switch is on, calibration mode is enabled by setting CalMode=True, and KDAIG= KDAIG2=Kdcal, in step 35, as discussed more fully below.

If step 45 determines that the wheels are not slipping, then the system proceeds to step 50, where the new digital pulse information is summed, LFT=LFT+LF, RFT=RFT+RF, LRT=LRT+LR, RRT=RRT+RR and dist=LFT+RFT+LRT+ RRT. This is followed by step 60, which determines whether one or more complete revolutions of all wheels—the short distance occurred a complete revolution has occurred and if the total number of digital pulses are greater than calibration KSHORTD, the routine proceeds to step 70 which calculates several parameters to allow a determination to be made of the acceptability of the data thus far collected. If not, the system proceeds to step 640 to wait for the next time period.

The next steps, 80–110, determine the suitability of the data for determining tire pressure imbalance. A series of steps are performed to see if the vehicle is stable. Typical criteria used are: lateral acceleration below a threshold (step 80), turning radius above a limit (step 90). At step 110, the difference between the diagonal ratio and the average value of this parameter calculated at steps 220–260 is used to eliminate data that is impossible to achieve due to pressure imbalances. The diagonal ratio is the ratio of the distance traveled by the left front and right rear tires over the distance traveled by all of the tires. This is done by summing the pulses for the wheels. If any of the required criteria are not met, the algorithm proceeds to step 140, where the values are reset. If the data accumulated thus far is acceptable, at step 150 this data is further aggregated into sums LFA, RFA, LRA, and RRA. At step 160, a determination is made to determine if a second total distance has been accumulated.

If the second required distance has been achieved (KMIDD), then at step 170, additional calculations are made to allow the following steps to determine the validity of the data. At step 180, the longitudinal ratio, which is the ratio of the distance traveled by the front wheels over the total distance traveled by all of the wheels, is used to determine if the vehicle is on a loose surface. Again, this is done by using the number of pulses. An additional compensation is made in step 180 to account for the additional distance the driven wheels of a vehicle will travel due to the tractive slip required to maintain vehicle velocity. This compensating factor is generally related to the speed of the vehicle when the data is recorded. If the vehicle is on a loose surface, the data is only accepted if the diagonal ratio is repeatable within a tolerance (KDIAGREP) at step 120, and not outside of a bound (KDAIG2) with respect to the average value of the diagonal ratio in step 130.

If the data meets the previous criterion, a last pulse accumulation is made to form the sums LFS, RFS, LRS, RRS at step 190. The acceleration, lateral acceleration and speed are also accumulated to keep track of the vehicle conditions as each record is added to the final sum. If at step 200, the distance LONGD (typically 0.05–0.2 miles) has been achieved, then the routine proceeds to step 210. At this point, the previous values of the ratios are saved and the longitudinal, diagonal and lateral ratios are calculated. The lateral ratio represents the ratio of the distance traveled by the left side tires over the distance traveled by all of the tires. At steps 220260, an average value of the diagonal ratio is created by using data only when the vehicle is traveling in a very consistent manner. This is typically determined by low acceleration (step 220), low lateral acceleration (step 230), and repeating values of the diagonal ratio (step 250). At step 260, the new data is averaged into the old to form the value AvgDiag.

At step 270, compensations are calculated to prevent false pressure imbalance detection caused by acceleration or turning. The basis for this compensation is the characteristic that a low-pressure tire will deform more than a properly inflated one, under loading from weight transfer caused by vehicle maneuvering. Without this compensation, a tire that is low, but above the detection threshold, could appear lower than the limit during maneuvers, giving a false or premature warning. At step 280, if the diagonal ratio is repeating within a narrow band, a running diagonal ratio average is created using the current value of the diagonal ratio. Additionally, in step 290, the pressure loss variable is calculated using the running average and the calibrated value of the diagonal ratio as well as the compensations calculated previously. It should be noted that the calibrated values of the diagonal ratio, lateral ratio, and the longitudinal ratio represent the values of these factors when the tires are in a known nominal state i.e. when the pressures are correct. The difference between these calibrated values and the current value of these ratios are generally proportional to the pressure imbalance being measured. If the diagonal ratio is not repeating within the band Krepeat, then in step 300, the running diagonal ratio is updated with the value AvgDiag, which represents the current value of the diagonal ratio when no maneuvers are occurring. In this way, the running average is prevented from being corrupted by vehicle conditions that could lead to false warnings. At step 310, the calculated pressure imbalance is compared to the desired threshold, Ktrip. If the limit is exceeded, an alert is indicated at step 320. If the pressure loss is below the threshold, step 330 determines if a warning is already in effect, if so, at steps 340–350, a determination is made if the alert should be cancelled. The alert is set to OFF at step 360 if the running average is close to the value AvgDiag and the calculated pressure loss is below the value Ktripoff. At step 370–380, a determination is made if the vehicle is changing speed or turning, if so, no further pressure loss checks are performed and the routine exits to step 570.

Steps 390–470 are used to detect the simultaneous loss of pressure in two tires on the same side of the vehicle. This type of pressure loss is difficult to determine using wheel rotation data because the effect of this type of pressure imbalance is the same as the effect of a vehicle performing a turn. At steps 390–410, the lateral ratio is checked to determine if it is repeating within a narrow band (Klat) at least Kcnt times in a row. If the value repeats as required, the routine proceeds to step 420, otherwise it exits to step 480, clearing the counter if appropriate. At step. 420, a comparison is made to determine if the loss alert should be set to ON. The comparison is based on the difference between the calibrated value of the lateral ratio and the current filtered value. If the pressure loss is above Ktrig, the repeat counter is cleared at step 450 and the warning set at step 460. If the calculated pressure loss is below the level to set the warning, at step 430, the loss is compared to the calibration Ktripoff to determine if the warning should be cleared. If required, the warning is cleared at step 440.

Steps 480–560 are used to detect the simultaneous loss of pressure in two tires on the same end of the vehicle. This type of pressure loss is difficult to determine using wheel rotation data because the effect of this type of pressure imbalance is the same as the effect of a vehicle traveling in a situation where a large amount of power is required to maintain speed. Some examples are driving at high. speed, climbing a long grade or towing. At steps 480–500, the compensated value of longitudinal ratio is checked to determine if it is repeating within a narrow band (Klong) at least Kcnt times in a row. If the value repeats as required, the routine proceeds to step 520, otherwise it exits to step 570, clearing the counter if appropriate. At step 520, a comparison is made to: determine if the loss alert should be set to ON. The comparison is based on the difference between the calibrated value of the longitudinal ratio and the current filtered value. If the pressure loss is above Ktrig, the repeat counter is cleared at step 530 and the warning set at step 540. If the calculated pressure loss is below the level to set the warning, then at step 550, the loss is compared to the calibration Ktripoff to determine if the warning should be cleared. If required, the warning is cleared at step 560. The routine then proceeds to step 570, where a check is made to see if the calibration mode is in effect. If the calibration mode is not active, the routine is complete at step 640.

In calibration mode, at steps 580–590, each of the ratios is checked for repeatability within the band Kcal. Any ratio that varies outside this band causes the process to proceed to step 640 to wait for the next time period. At step 595, calcnt is checked to determine if the values of A1, A2, A3, need to be initialized, if this is the first execution of the calibration routine, at step 600 the ratio averages are initialized. At step 610, the counter calcnt is incremented and a running average created for each of the three ratios: lateral, longitudinal and diagonal. The routine proceeds to step 620, where the value of calcnt is compared to Kcalrep to determine if the required number of repeating ratios has occurred to allow the determination of a valid calibration. At step 630, the running ratio averages are stored in the respective variables LatCal, LongCal, and DiagCal. In addition, the several other variables are initialized and the calibration mode is completed. The routine then goes to step 640 where it remains dormant until the next real-time interrupt, which will begin execution at referenced step 10.

What is claimed is:

1. A method of detecting tire pressure imbalances in a set of tires of a vehicle, the vehicle having four wheels, a right front wheel, a left front wheel, a right rear wheel and a left rear wheel, each of the four wheels having a sensor generating a pulse for a predetermined amount of distance traveled by the respective wheel, said method comprising the steps of:

initiating a calibration mode;

accumulating a number of pulses generated by each sensor during a predetermined calibration time interval;

storing the number of pulses generated by each sensor during a measured interval equal in length to the calibration interval into an individual account for each sensor in a storage device;

computing a stability check using the number of pulses stored in the individual accounts, discarding the numbers stored in the individual accounts if the stability check is unsatisfactory;

summing the number of pulses in each of the accounts for a comparison total for each measured interval not discarded;

comparing the comparison total to the calibration standard; and triggering an alarm when the comparison total is less than the calibration standard for a predetermined number of measured intervals.

2. The method of claim 1, wherein the stability step includes checking for slippage by comparing a front axle sum of the accounts for the right front wheel and left front wheel with a rear axle sum of the accounts for the left rear wheel and right rear wheel, discarding the numbers in the account if the sum of the front axle differs by more than a predetermined amount from the rear axle sum.

3. The method of claim 2, wherein the checking step further includes computing a diagonal ratio by comparing a first diagonal sum of the accounts for the right front wheel and the account for the left rear wheel with a second diagonal sum of the accounts for the left front wheel and the account for the right rear wheel for the measured interval; and discarding the numbers in the accounts if the diagonal ratio is above a predetermined amount.

4. The method of claim 3 wherein the checking step further includes computing a longitudinal ratio by comparing the front axle sum to the rear axle sum and discarding the numbers in the accounts if the longitudinal ratio is above a predetermined amount.

5. The method of claim 2 wherein the checking step further includes computing a lateral ratio by comparing the sum of accounts for one side with the sum of the accounts for all wheels, the sum of accounts for one side being the front left wheel and the left rear wheel or the sum of pulses for the right front wheel and the right rear wheel, and discarding the numbers in the accounts if the longitudinal ratio is above a predetermined amount.

6. The method of claim 4 wherein the checking step further includes discarding the numbers in the accounts if the longitudinal ratio is above a predetermined amount and the diagonal ratio is within a predetermined range.

7. The method of claim 5 wherein the calibration step includes computing a calibration lateral ratio by comparing the sum of the accounts of one side during the calibration step, the one side being the left front wheel and the rear left wheel or the front right wheel and the rear right wheel, with the sum of the numbers in the four accounts; and issuing an alarm if the lateral ratio for the measured interval remains in a predetermined range which is greater than a predetermined amount from the calibration lateral ratio.

8. The method of claim 4 herein the calibration step includes computing a calibration longitudinal ratio by comparing the front axle sum to the rear axle sum during the calibration interval, and the step of issuing an alarm if the longitudinal ratio computed during the measured interval is more than a predetermined amount from the calibration longitudinal ratio.

9. The method of claim 1 wherein the measured interval is one millisecond.

10. A tire pressure detection system for a vehicle having a plurality of wheels comprising:

providing a pulse generating sensor for each wheel of the vehicle to generate a pulse sum for each wheel as each wheel rotates;

adding the pulse sums from the pulse generating sensors of each wheel to generate a total sum of pulses for all the pulse generating sensors;

comparing the total sum of pulses to a calibrated pulse sum;

comparing the pulse sum of at least one wheel to an individual wheel calibrated pulse sum when the total sum of pulses is equal to the calibrated pulse sum;

triggering an indicator when the pulse sum of the at least one wheel is not equal to the individual wheel calibrated pulse sum.

11. The system of claim 10 further comprising:

generating a ratio of pulse sums for two wheels;

comparing the ratio of pulse sums to a calibrated ratio of sums for two wheels when the total sum of pulses is equal to the calibrated pulse sum; and triggering an indicator when the ratio of pulse sums is not equal to the calibrated ratio of sums.

12. The system of claim 10 further comprising receiving the pulse sums from an anti-lock brake system.

13. The system of claim 10 further comprising the anti-lock brake system transmitting the pulse sums periodically.

14. A method of detecting tire pressure imbalances in a set of tires of vehicle, the vehicle having four wheels, and each wheel having a sensor generating a pulse for a predetermined amount of distance traveled by the wheel, the method comprising:

entering a calibration mode;

accumulating a number of pulses from each sensor and adding the number of pulses from each sensor to generate a calibrated total pulse count in the calibration mode;

storing the individual pulse sums of each said sensor used to generate the calibrated total pulse count as individual pulse sum calibration values;

storing the calibrated total pulse count;

exiting the calibration mode;

accumulating a number of pulses from each sensor to generate operating individual pulse sums and adding the number of operating individual pulse sums to generate an operating pulse count;

determining if the operating pulse count is equal to the calibrated total pulse count;

comparing at least one of the operating individual pulse sums to the individual pulse sum calibration values when the operating pulse count is equal to the calibrated total pulse count; and triggering an indicator if at least one of the operating individual pulse sums is not equal to the individual pulse sum calibrations.

15. The method of claim 14 further comprising:

generating a ratio of operating individual pulse sums for at least two wheels;

comparing the ratio of operating individual pulse sums to a ratio of individual pulse sum calibration values for the at least two wheels; and triggering an indicator when the ratios are not equal.

16. A system for detecting tire pressure imbalance in a vehicle comprising:

a plurality of wheels coupled to the vehicle;

a plurality of pulse generating sensors operatively coupled to said plurality of wheels, each said pulse generating sensor generating a pulse for a predetermined amount of distance traveled by each said wheel;

a controller for receiving said pulses generated by said plurality of pulse generating sensors;

wherein said controller accumulates individual pulse sums from each of said pulse generating sensors pulses to generate a sum of total pulses;

wherein said controller stores said individual pulse sums and said sum of total pulses;

wherein said controller compares said sum of total pulses to a calibrated pulse total;

wherein when said sum of total pulses is equal to said calibrated pulse total, said controller compares at least one of said individual pulse sums to a calibrated individual pulse sum for a specific wheel; and wherein when at least one of said individual pulse sums is not equal to said calibrated individual:. pulse sum for a specific wheel an indicator will be triggered.

17. The system of claim 16 wherein said individual pulse sums from at least two wheels are used to generate a ratio;

wherein said ratio is compared to a calibrated ratio; and wherein an indicator is triggered when said ratio is not equal to a calibrated ratio.

18. The system of claim 16 wherein said pulse generating sensors are coupled to an anti-lock brake system and said anti-lock brake system transmits said pulses to said controller.

19. A system for detecting tire pressure imbalance comprising:

a vehicle;

a plurality of wheels coupled to said vehicle;

a plurality of sensors operatively coupled to said plurality of wheels, each said sensor sensing one of said plurality of wheels, said sensors generating pulses indicative of distance traveled by each said wheel;

a controller for receiving said pulses generated by said sensors;

wherein said controller accumulates individual pulse sums from each of said pulse generating sensors pulses to generate a sum of total pulses;

wherein said controller:stores said individual pulse sums and said sum of total pulses;

wherein said controller compares said sum of total pulses to a calibrated pulse total;

wherein when said sum of total pulses is equal to said calibrated pulse total, said individual pulse sums from at least two wheels are used to generate a ratio;

wherein said ratio is compared to a calibrated ratio; and wherein an indicator is triggered when said ratio is not equal to a calibrated ratio.

20. The system of claim 19 wherein said plurality of sensors are coupled to an anti lock brake system and said anti-lock brake system transmits said pulses to said controller.

21. A method of calibrating for tire pressure imbalances in a set of tires of vehicle, the vehicle having four wheels, and each wheel having a sensor generating a pulse for a predetermined amount of distance traveled by the wheel, the method comprising:

entering a calibration mode;

accumulating a number of pulses from each sensor and adding the number of pulses from each sensor to generate a calibrated total pulse count in the calibration mode;

storing the individual pulse sums of each sensor used to generate the calibrated total pulse count as individual pulse sum calibration values;

storing the calibrated total pulse count; and exiting the calibration mode.

22. The method of claim 21 further comprising rejecting the calibrated total pulse count and individual pulse sum calibration values if a ratio of individual pulse sums is not equal to a calibrated value.

23. The method of claim 21 further comprising rejecting the calibrated total pulse count and individual pulse sum calibration values if the vehicle is turning.

24. A method of detecting tire pressure imbalances in a set of tires of vehicle, the vehicle having four wheels, and each wheel having a. sensor generating a pulse for a predetermined amount of distance traveled by the wheel, the method comprising:

entering a calibration mode;

accumulating a number of pulses from each sensor and adding the number of pulses from each sensor to generate a calibrated total pulse count in the calibration mode;

storing the individual pulse sums of each sensor used to generate the calibrated total pulse count as individual pulse sum calibration values;

generating at least one ratio of the individual pulse sum calibration values;

storing the at least one. ratio of the individual pulse sum calibration values;

storing the calibrated total pulse count;

exiting the calibration mode;

accumulating a number of pulses from each sensor to generate operating individual pulse sums and adding the number of operating individual pulse sums to generate an operating pulse count;

determining if the operating pulse count is equal to the calibrated total pulse count;

generating a ratio of operating individual pulse sums for at least two wheels;

comparing the ratio of operating individual pulse sums to the at least one ratio of individual pulse sum calibration values for the at least two wheels when the operating pulse count is equal to the calibrated total pulse count; and triggering an indicator when the ratios are not equal.

* * * * *